Figures 1, 2, 3:
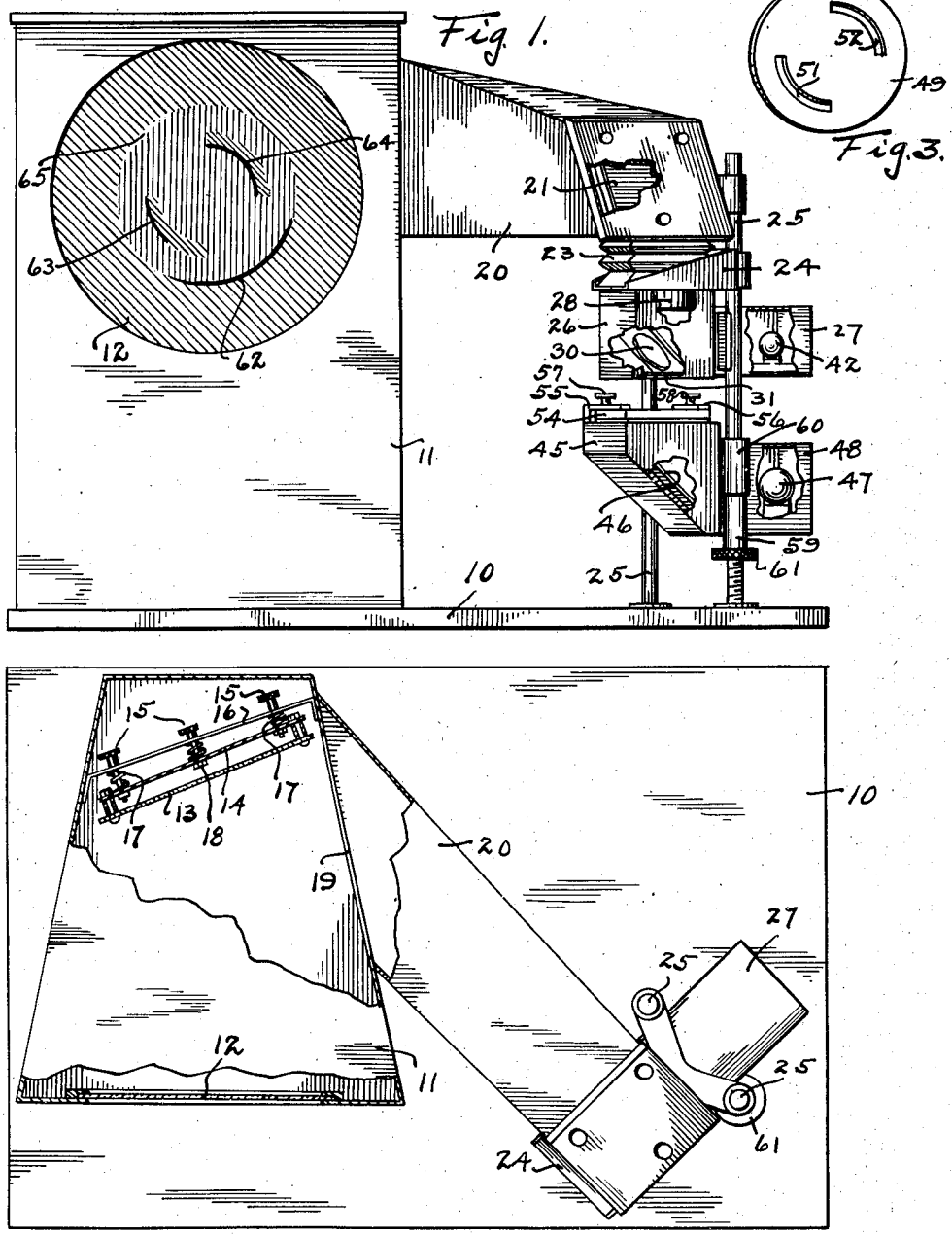

Aug. 27, 1946.   R. F. BORKENSTEIN   2,406,451
OPTICAL MEANS FOR INSPECTION
Filed Dec. 31, 1943   2 Sheets-Sheet 1

INVENTOR.
Robert F. Borkenstein,
By Herbert A. Minturn,
Attorney.

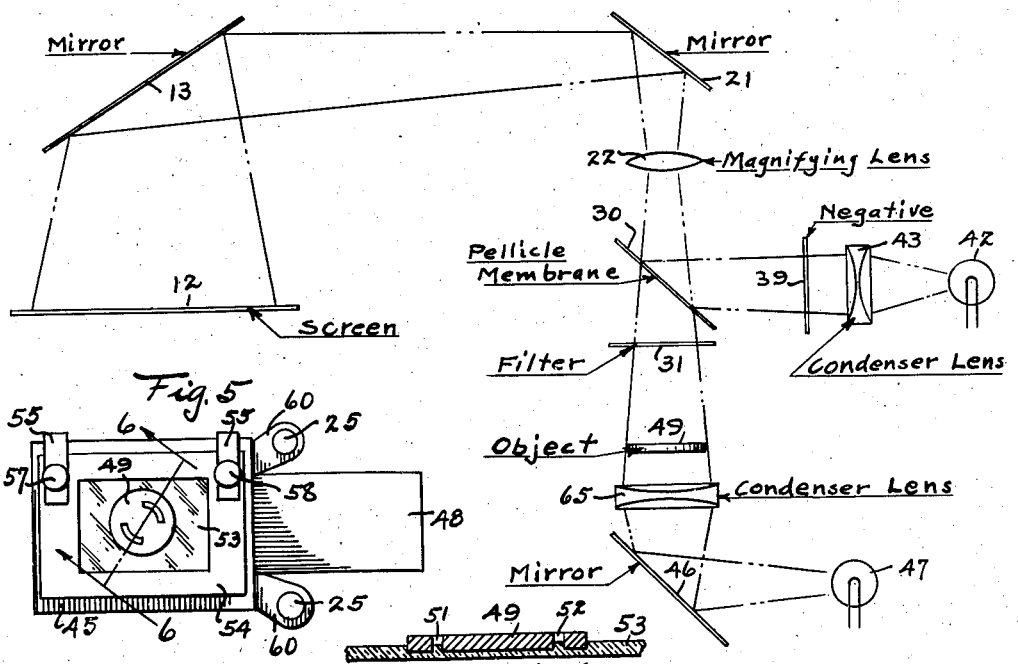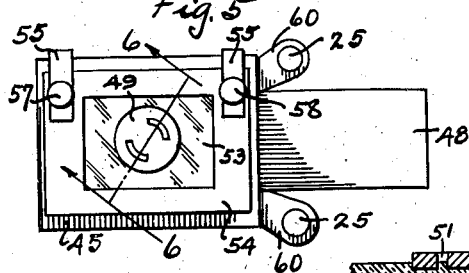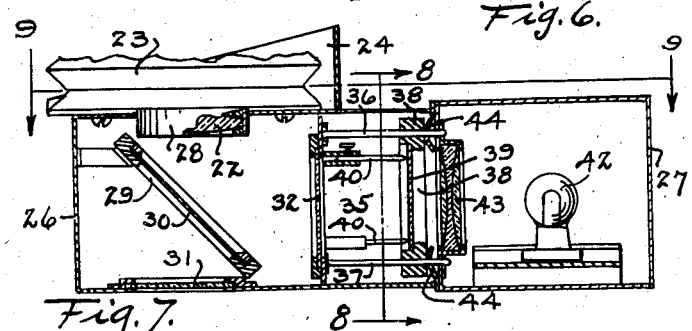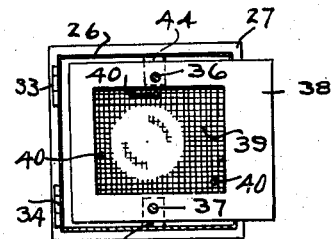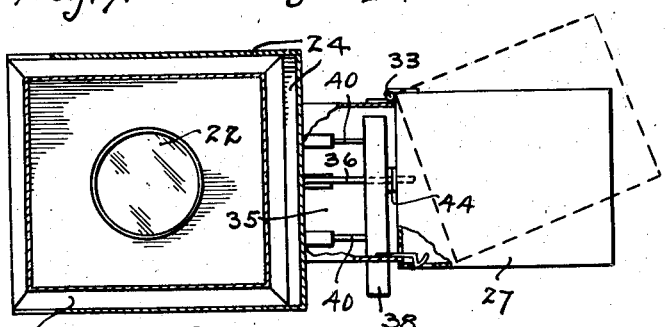

Patented Aug. 27, 1946

2,406,451

UNITED STATES PATENT OFFICE

2,406,451

OPTICAL MEANS FOR INSPECTION

Robert F. Borkenstein, Indianapolis, Ind.

Application December 31, 1943, Serial No. 516,373

2 Claims. (Cl. 88—24)

This invention relates to optical means for inspection of outline contours and surfaces of mechanical parts by use of an optical system wherein discrepancies only from a standard are made visible upon a screen to give the exact or a proportionate measure thereof. In the present form of the invention herein shown, oversize variations will be indicated by a dark or black area, whereas undersize discrepancies will be indicated in white or no color areas. No visible comparison is had wherein the operator must check between a standard image and an image of the part being inspected in order to arrive at any variations or discrepancies therebetween. Instead, as already indicated, the variation only is shown by use of my invention.

A further important object of the invention is to provide an exceedingly simple and compact means including an optical system that is reduced to a minimum number of parts and yet giving very accurate and consistent results.

A still further important object of the invention resides in the method of cancelling out from the image of the object being inspected all parts thereof except those parts that may vary from a standard size object.

These and many other objects and advantages of the invention will become apparent to those versed in the art in the following description of one particular form of the invention as illustrated in the accompanying drawings, in which Fig. 1 is a view in front elevation of a structure embodying the invention;

Fig. 2, a top plan view;

Fig. 3, a view in perspective of a sample object employed to illustrate the operation of the invention;

Fig. 4, a diagram of the optical system;

Fig. 5, a detail in top plan view of the parts holder unit;

Fig. 6, a detail on an enlarged scale in vertical section on the line 6—6 in Fig. 5;

Fig. 7, a vertical longitudinal section through the negative holding box;

Fig. 8, a view in vertical transverse section on the line 8—8 in Fig. 7; and

Fig. 9, a view in transverse horizontal section on the line 9—9 in Fig. 7.

Like characters of reference indicate like parts throughout the several views in the drawings.

The invention may be embodied in many forms of structure and the present form selected for showing herein is one of such structures designed to indicate a magnified showing of variations of the dimensions of a part as compared to standard required dimensions. In the present form of the invention there is mounted on a base 10 a screen housing 11 which is trapezoidal in horiontal section and carries a translucent circular screen 12 across an opening in the front vertical wall. Toward the back of the housing 11 is mounted a mirror 13 extending in a vertical plane aand so mounted as to be angularly adjustable both horizontally and vertically by any suitable means. One such means, as herein shown, Fig. 2, is to mount the mirror 13 on a plate 14 therebehind in a fixed manner and then employ a number of screws 15, herein shown as three in number, to extend through a fixed plate 16 to carry compression springs 17 between the plate 16 and the plate 14, and have these screws 15 screw-threadedly engage with the plate 14 or nuts 18 fixed thereto, whereby the plate 14 may be rocked in any direction desired by manipulating any one or more of the screws 15.

The housing 11 is provided with a window 19 on one side from which extends a tunnel 20 forwardly and outwardly. In the outer end of this tunnel 20 is positioned a mirror 21 inclined over a lens 22 mounted therebelow whereby light coming through that lens 22 may be reflected by the mirror 21 onto the mirror 13 and back onto the screen 12. The only purpose of employing the mirrors 13 and 21 is to permit the use of a compact structure instead of having to employ one wherein the light coming through the lens 22 is conducted on a straight axis without bending to obtain the desired degree of magnification or size of image on the screen 12.

The lens 22 is mounted in the under side of a bellows housing 23 as in the usual camera practice whereby the lens 22 may be raised and lowered in reference to the mirror 21 and finally fixed to obtain the desired focusing. This bellows housing 23 is supported through a bracket 24 on vertically disposed posts 25 (two in number) mounted on the base 10.

This bracket 24 further carries, attached to its under side, a negative holder box and a lamp housing, designated by the respective numerals 26 and 27. The negative box 26, in the one form herein shown, has the lens 22 carried within the upper portions thereof, Fig. 7, within the mounting 28. Below the mounting 28 is positioned a pellicle holder 29 to carry a pellicle 30 (a transparent lacquer film, as one example) stretched thereacross in a plane substantially forty-five degrees to the axis of the lens 22. In the floor of the box 26 under the pellicle 30 is an opening across which is placed a filter plate 31, preferably primary green in color.

In that end wall of the box 26 facing the upper side of the pellicle 30 is a window across which is placed a transparent cover, such as clear glass 32. From this end wall of the box 26 there is an extension of the side walls, against the outer ends of which is positioned the lamp housing 27, by any suitable means, herein shown as by means of the hinges 33 and 34, Fig. 8, whereby the lamp housing 27 may be swung around rearwardly, as indicated by the dash lines, Fig. 9, to give access to the chamber within those extended walls of the negative box 26. Within this extended chamber, designated by the numeral 35, are mounted top and bottom holder pins 36 and 37 in parallel horizontal alignment. A negative holding frame 38 is provided with holes through which the pins 36 and 37 may pass, Fig. 7, as means for supporting and aligning the frame.

This frame 38 is provided with means for receiving and holding, such as by a rabbet, a glass negative 39 in a fixed manner. In the chamber 38 are a plurality of position limiting pins 40, herein shown as three in number, Figs. 7–9, adjustably extensible horizontally to have their outer ends in the path of the negative 39 when the frame 38 is shifted into the chamber 35 on the supporting pins 36 and 37. The positions of the outer ends of these pins 40 determine the plane of the negative 39 in relation to the pellicle 30 and lens 22.

This negative 39 is a photographic negative on a glass plate of a standard sized and shaped specimen against the proportions and dimensions of which production items and the like are to be checked for variations therefrom.

Within the lamp housing 27 is mounted any suitable light source, such as the lamp 42, preferably horizontally adjustable and designed within practical limitations to have a small point source of light on an axis of a condensing lens 43 carried across a window in the end of the box 27 adjacent the negative 39. The box 27 is provided with a pair of springs 44, one for each of the pins 36 and 37 and perforated to receive the outer ends of those pins therethrough respectively when the box 27 is in the closed position, whereby the springs 44 are resiliently urged against the frame 38 to carry the negative 39 against the locating pins 40.

Below the negative box 26 is positioned the object holder, generally designated by the numeral 45, consisting essentially of a box within which is mounted an inclined mirror 46 positioned to reflect light from a light source, such as the lamp 47 that is carried in the lamp housing 48 fixed to the object holder 45. The mirror 46 is so inclined as to reflect light from the lamp 47 upwardly toward the filter screen 31.

Across the top of the object holder 45 is mounted any suitable means for aligning the object to be inspected in respect to the axis of the lens 22 and in respect to the reflected image from the negative 39. Selected in the present showing of the invention as an example only, and without any limitations employed, of a sample piece to be inspected, is a disc 49, Fig. 3, through which are cut two arcuate slots 51 and 52. It is to be assumed for purposes of explaining the invention, that the outer circumferential margin of this piece 49 and the contour of the slots 51 and 52 are to be held within certain dimensional limitations. In this case the negative 39 will be an actual photographic negative of a standard piece 49, the body of the piece showing as a transparent area while the remainder of the area will be opaque. The piece 49 itself is oriented across the holder 45 above the mirror 46 by placing it on a transparent glass base 53 that is mounted in a fixed manner within the frame 54, and the frame 54 is fixed in position in respect to horizontal rotation by inserting the frame under clamps 55 and 56, Fig. 5, to have screws 57 and 58, as carried by these respective clamps, turned down to bear against the frame 54. The piece 49 is fixed against rotation on the glass 53 by any suitable means, herein shown as by having the glass 53 formed with a depressed area into which the under side of the piece 49 may be fitted and to have parts of the glass 53 extend up into the slots 51 and 52 so as to prevent shifting of the piece 49 relative to the glass 53. Obviously the frame 54 may be shifted in straight line directions as well as rotated on the upper side of the holder 45. The holder 45 is adjustably carried along the vertical posts 25 by any suitable means, herein shown as by means of a sleeve 59 screw-threadedly engaging with the lower threaded portion of one post 25 and bearing against the under side of a bracket 60 that is fixed to the holder 45, whereby suitable turning of the sleeve 59 through a knurled head 61 will raise and lower the holder 45 along the posts 25.

In practice, the negative 39 is made to be of that size which will permit the showing of an image therefrom on and within the limitations of the size of the screen 12. This negative 39 is mounted in the manner above described and likewise the specimen piece 49 is placed in position on the holder 45 and the frame 54 adjusted to bring the image thereof as shown on the screen 12 into as nearly a matched condition as possible, this condition being indicated by the minimum size of white and black areas produced on the screen. Light from the lamp source 47 is reflected upwardly by the mirror 46 through and around the specimen 49; through a condenser lens 65 in the housing 45; through the green filter 31; through the pellicle 30; through the lens 22; against the mirror 21; from the mirror 21 against the mirror 13; and from the mirror 13 onto the screen 12. All of the area of that light reaching the screen 12, passing around the outside of the specimen 49 and through the slots 51 and 52, will appear in green color in accordance with the color of the filter 31, as indicated by the lining in Fig. 1.

Light from the lamp source 42 will travel through the condensing lens 43; the negative 39; the transparent member 32; strike the upper surface of the pellicle 30 and be reflected upwardly through the lens 22; strike the mirror 21 and be reflected against the mirror 13; and in turn be reflected from the mirror 13 against the screen 12 to illuminate that area on the screen otherwise appearing as black. This illuminated area, however, will appear to the eye as pink. Now should the piece 49 have any marginal portions thereof, including the slot contours, either oversize or undersize in respect to the standard dimensions, the oversize condition will be indicated at once by the black area portions 62 for a peripheral location, and 63 and 64 for slot margins, whereas undersize conditions will be indicated by white areas, such as the area 65 on a peripheral portion of the piece. That is, oversize conditions will be indicated by black lines or areas and undersize conditions will be indicated by white areas. With the degree of magnification known, the correction required will be indicated accordingly by the dimensions of the black and white areas.

Surfaces of parts may be checked in the same manner, in which case the surface of the part itself would be illuminated to have reflected light therefrom pass upwardly through the pellicle 30. The negative 39 in that case would be a negative of the standard surface and any variations from that standard would show up on the screen 12 in exactly the same way as above indicated.

Transmission of light vertically through the inclined pellicle 30 is, of course, reduced, but by sufficient intensity at the source lamp 47 adequate light will be had through the pellicle. The pellicle is employed to give not only the reflection from the upper surface but also the reflected transmission therethrough. The lamp 47 could be mounted directly below the piece 49 instead of being placed to one side thereof to eliminate the mirror 46, but excessive heat conditions would probably arise and, therefore, the lamp 47 is mounted to one side of the axis through the lens 22.

While I have herein shown and described my invention in more or less minute detail in respect to the one structural form herein shown, it is obvious, as above indicated, that the invention may be embodied in a wide range of structures without departing from the spirit of the invention and I therefore do not desire to be limited to this precise form beyond the limitations as may be imposed by the following claims.

I claim:

1. In a projection apparatus for indicating and giving proportional measure of discrepancies only between outline contours and surfaces of physical objects and standard sized and shaped negative images of the objects, the combination of a screen; a single projecting objective lens; a holder for an object; a negative of the object in standardized form; means for setting up a projection beam from the object held by said holder; means for setting up a projection beam from said negative; transparent mirror means combining both of said projecting beams into a single projection beam through said lens to said screen; and means for adjusting said object holder relative to said negative, transversely in respect to said single projection beam to match as nearly as possible the images from the negative and the object as indicated by the minimum attainable areas of black and white on the screen; whereby said single projection beam produces on said screen a resultant image displaying discrepancies only between said object and said negative; and a color filter plate interposed across the path of the projection beam from said object before combination with said negative beam to produce a corresponding color area modified by said negative beam to be limited by marginal portions to have said discrepancies appear as black and white areas in accordance with oversize and undersize conditions of the object.

2. In a projection apparatus for indicating and giving proportional measure of discrepancies only between outline contours and surfaces of physical objects and standard sized and shaped negative images of the objects, the combination of a screen; a single projecting objective lens; a holder for an object; a negative of the object in standardized form; means for setting up a projection beam from the object held by said holder; means for setting up a projection beam from said negative; transparent mirror means combining both of said projecting beams into a single projection beam through said lens to said screen; and means for adjusting said object holder relative to said negative, transversely in respect to said single projection beam to match as nearly as possible the images from the negative and the object as indicated by the minimum attainable areas of black and white on the screen; whereby said single projection beam produces on said screen a resultant image displaying discrepancies only between said object and said negative; and a color filter plate interposed across the path of the projection beam from said object before combination with said negative beam to produce a corresponding color area modified by said negative beam to be limited by marginal portions to have said discrepancies appear as black and white areas in accordance with oversize and undersize conditions of the object; said color filter being green.

ROBERT F. BORKENSTEIN.